April 19, 1949.  A. B. WELTY  2,467,790
CORN SHELLER
Filed June 2, 1944  3 Sheets-Sheet 1
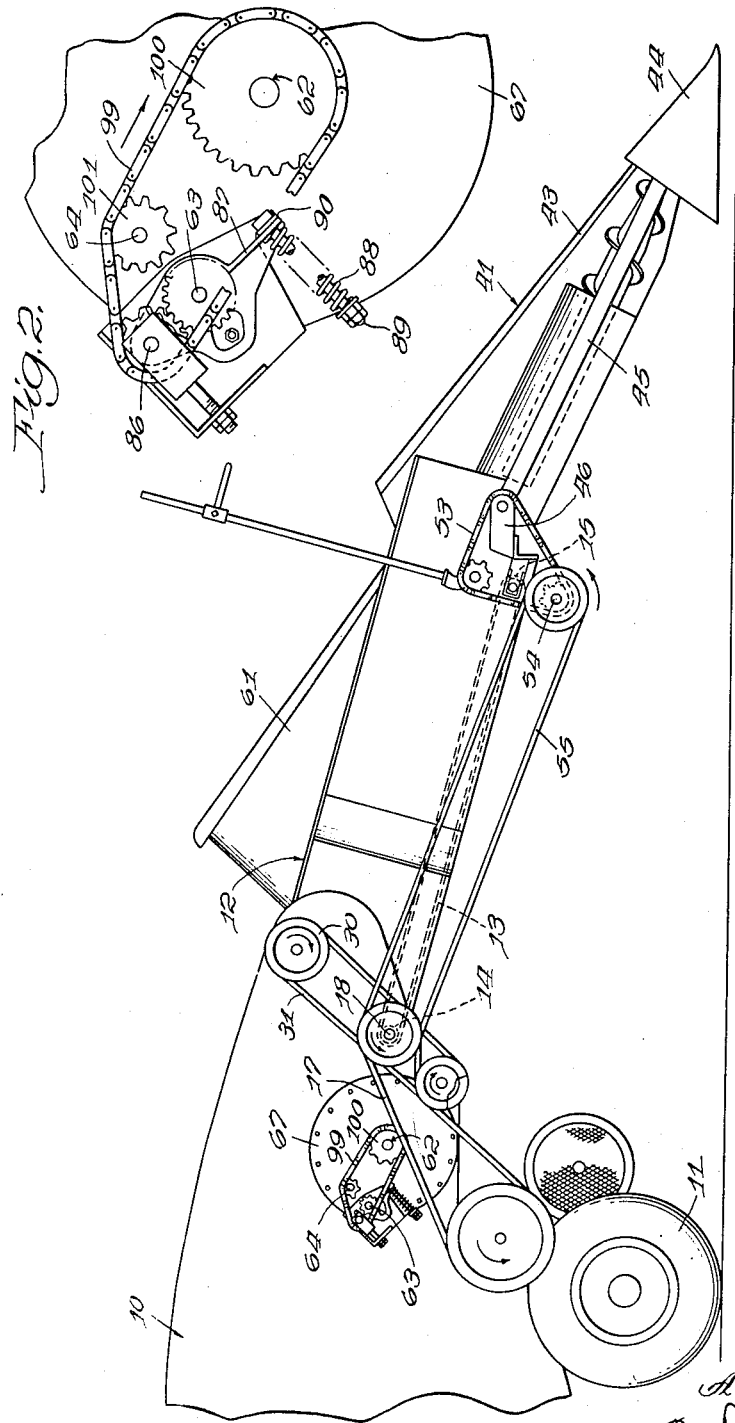
Inventor:
Albert B. Welty.
By Paul O. Pippel
Atty.

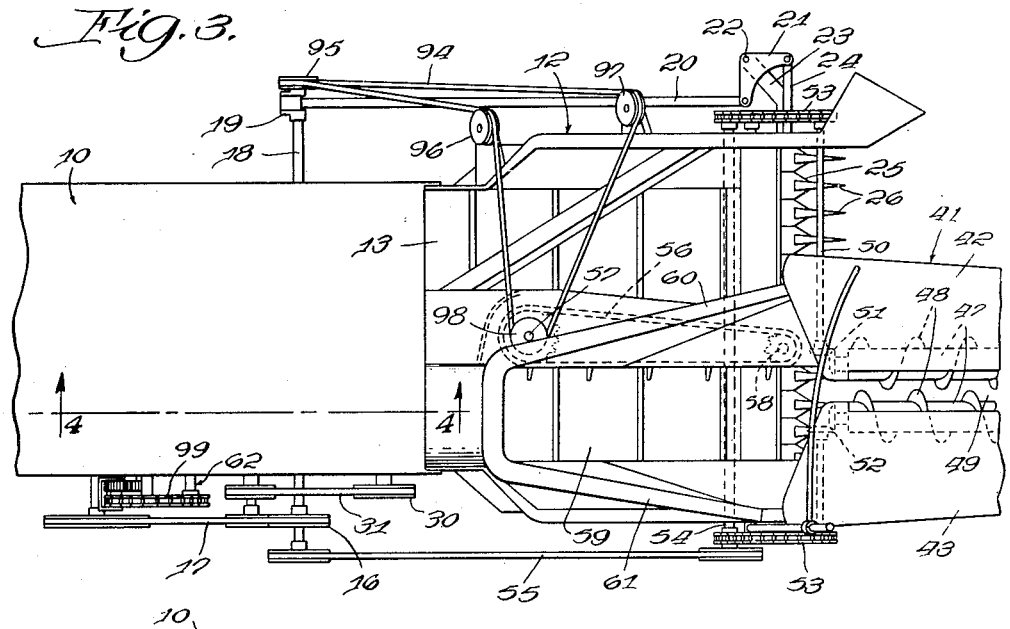
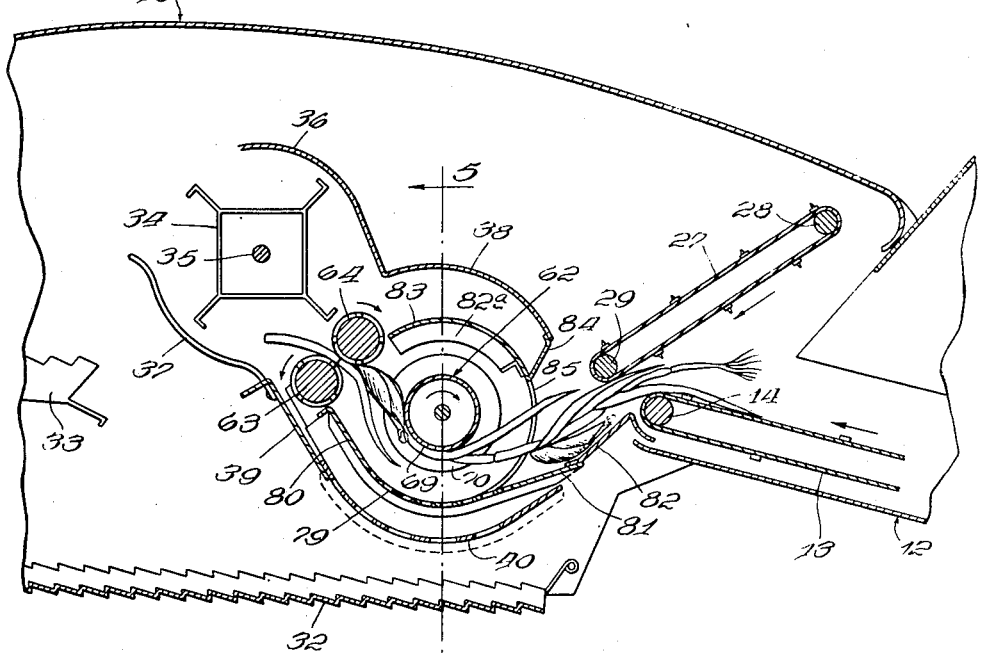

April 19, 1949.  A. B. WELTY  2,467,790
CORN SHELLER
Filed June 2, 1944.  3 Sheets-Sheet 3
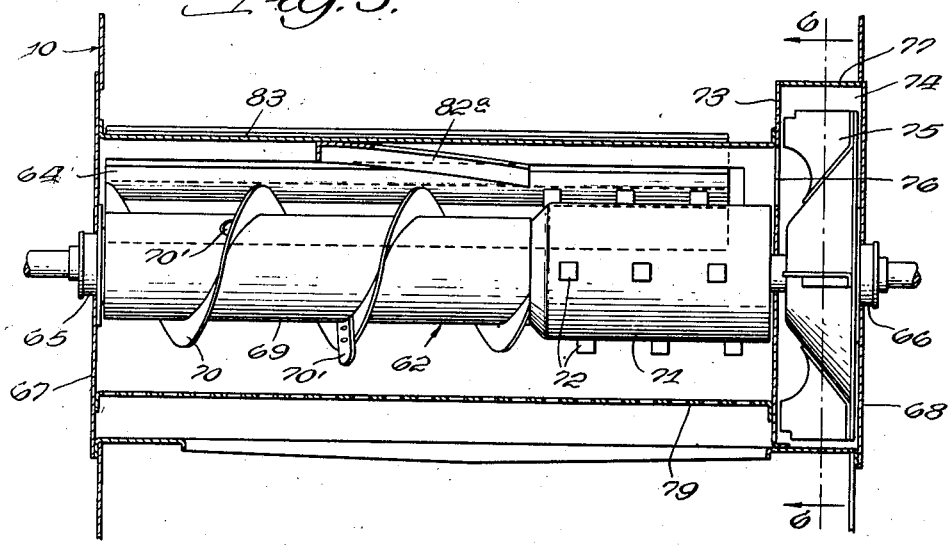
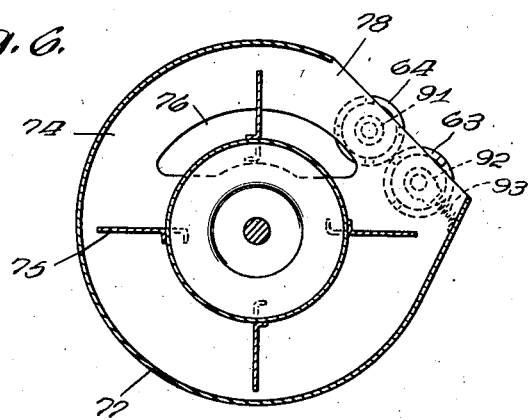
Inventor:
Albert B. Welty.
By Paul O. Rippel
Atty.

Patented Apr. 19, 1949

2,467,790

UNITED STATES PATENT OFFICE 2,467,790

CORN SHELLER

Albert B. Welty, Moline, Ill., assignor to International Harvester Company, a corporation of New Jersey Application June 2, 1944, Serial No. 538,460

3 Claims. (Cl. 130—5)

This invention relates to a corn harvesting and shelling device. More particularly it relates to a field harvester and sheller particularly adapted for use with a conventional harvester thresher.

In the harvesting of corn, mechanical pickers have come into extensive use in recent years. Most of the pickers operate with inclined snapping rolls which snap the ears from the standing stalks. Other types of pickers have been proposed which sever the standing stalks and deliver them to a snapping mechanism. Constructions have also been proposed which shell ears which have been snapped from the stalks by either one of the above described methods. The present invention concerns itself with an improvement in corn harvesting wherein the stalks are severed and delivered to a combined snapping and shelling mechanism, the entire structure for accomplishing the cutting, snapping and shelling being readily adapted to a conventional harvester-thresher mechanism.

A principal object of the present invention is to provide an improved corn snapping and shelling mechanism. A subsidiary object is to provide a unitary snapping and shelling mechanism coaxially alined in order to require a minimum number of moving parts.

Another principal object is to provide an attachment for harvester threshers wherein standing stalks may be severed and delivered into a snapping and shelling mechanism substituted for the usual threshing cylinder of the harvester thresher. Another subsidiary object is to provide a construction in which the cutter mechanism and conveying apron of a harvester thresher may be utilized in combination with additional mechanism for severing and conveying stalks butt first to a snapping mechanism. Another specific object is to provide diverting means on a wide harvester apron whereby stalks and ears falling thereto will be diverted into the throat of a snapping mechanism.

The above objects and others, which will be apparent by the detailed description to follow, are accomplished by a construction such as illustrated in the drawings, in which:

Figure 1 is an elevation showing the front portion of a conventional harvester-thresher mechanism with the corn harvester device of the invention associated therewith;

Figure 2 is an enlarged elevation of the drive mechanism for the snapping and husk-eliminating rolls;

Figure 3 is a plan view of the structure shown in Figure 1;

Figure 4 is a vertical longitudinal sectional view taken on the line 4—4 of Figure 3;

Figure 5 is a vertical transverse section taken substantially on the line 5—5 of Figure 4; and Figure 6 is a vertical section taken on the line 6—6 of Figure 5.

In the drawings, only sufficient portions of a conventional harvester thresher are shown as are necessary to illustrate the attachment and operation of the corn harvesting and shelling device of the invention. The allowed application Serial No. 365,952 shows the complete operating parts of a harvester thresher as partially illustrated in Figures 1, 2, and 4. Said harvester thresher is of the traveling type adapted to be drawn through the field of grain by a tractor. The thresher part which is enclosed by a sheet-metal body 10 is provided with supporting wheels, one of which 11 is visible in Figure 1. A harvester part 12 pivotally connected to the thresher part 10 extends forwardly and downwardly therefrom. An apron 13 mounted on a driving roller 14 at the upper end of the harvester part 12 and on a roller 15 at the lower end of the harvester part is operated in the direction indicated by the arrow in Figure 1. The upper roller may be driven by a pulley 16 and a V-belt 17 as indicated or by any suitable mechanism. It will be understood that the driving mechanism for any other moving parts to be hereinafter described may be provided by any conventional means including chain, gears, sprockets, pulleys, shafts, and the like.

Figure 3 shows a driving mechanism for a cutter mechanism mounted on the harvester part 12. The roll 14 previously referred to may be carried by a transverse shaft 18 on which the pulley 16 may be mounted. As shown in Figure 3, said shaft extends laterally from the body portion of the thresher part 10 and carries a crank portion 19 on which a pitman 20 is mounted. Said pitman is connected to a rocker member 21 pivoted at 22 on a bracket 23 extending laterally from the harvester part 12. Said rocker member is connected by suitable means 24 with a reciprocating sickle bar 25 of conventional construction. Said bar is illustrated as extending entirely across the lower front portion of the harvester part 12 cooperating with guards 26 of a conventional type. In the use of the machine as a harvester thresher, cutting takes place across the entire front portion of the harvester part, severed material being delivered to the conveyer apron 13 which carries it upwardly and rearwardly into the threshing cylinder. As shown in Figure 4, an upper conveyer 27 mounted on rollers 28 and 29 assists in feeding material delivered by the apron 13 into the thresher part of the machine. The roll 28 projects laterally to one side of the machine carrying a pulley 30 which is driven by a belt 31 as illustrated in Figure 3.

Referring to Figure 4, the parts of the machine which are standard harvester thresher parts will be first described. The body portion of the thresher part 10 is, as previously stated, a standard thresher construction as illustrated in the application referred to. In Figure 4 a portion of a grain pan 32 is illustrated as well as a portion of a straw rack 33. These elements in a conventional harvester thresher are reciprocated to give the required agitation and direction of movement to material delivered thereto from the threshing cylinder. A cylindrical beater 34 rotatably mounted on a shaft 35 is also illustrated. Said beater is partially surrounded on the upper side by a deflecting shield 36 and partially surrounded on the lower side by a beater grate 37. The shield 36 is extended forwardly to form a second shield 38 which normally surrounds the upper portion of the cylinder of a thresher. A plate 39 extends downwardly from the beater grate 37 and joins with a perforate curved sheet 40, which normally carries the concave for the threshing cylinder. In the construction illustrated a substitute concave element is provided, its function being to permit the passage of grain therethrough.

In order to convert a harvester thresher to a corn harvester machine, a gathering unit, indicated in its entirety by the reference character 41, is mounted by means of suitable frame structure on the harvester part 12 at one side thereof. Said gathering unit includes spaced side sections 42 and 43, each terminating in a gathering point 44. Said side sections may be carried on a frame structure, including for example a frame member 45, and may be pivotally mounted on the harvester part by brackets such as the bracket 46 indicated at 41. The mounting of the gathering unit 41 may take any conventional form, the invention being concerned only with the relation of the parts with respect to the cutting and conveying mechanism previously described.

The side sections 42 and 43 each carry a rotatable member 47 having a spiral 48 thereon. The spirals are in opposite directions and cooperate to deliver stalks into the throat 49 formed between the two side sections. Said stalk-forwarding means may be driven by means such as illustrated including a transverse shaft 50 and sets of bevel gears 51 and 52. The shaft 50 may be driven, as indicated, by chains 53 at each end of the shaft which in turn are driven by a transverse shaft 54. Said shaft 54 is driven by suitable pulleys and a belt 55 from the shaft 18.

As the machine travels forwardly over the field, the gathering points 44 pass alongside the rows of corn, the stalks being assisted in their rearward movement by the spirals 48. The stalks are then severed by the sickle bar 25, the butts of the stalks then passing onto the apron 13 and being carried upwardly thereby. To assist in maintaining the stalks in position, a conveyer chain 56 mounted on sprockets carried by vertical shafts 57 and 58 passes alongside a throat 59 which is formed between the upwardly extending side wall portions 60 and 61, said portions being respectively continuations of the side sections 42 and 43 of the gathering unit 44. In Figure 1, the outside of the wall portion 61 is visible. Said wall portions, as shown in Figure 1, extend upwardly to form a diverting shield for assuring passage of the stalks, butt first, between the apron 13 and the conveyor 27, as will be understood by an inspection of Figure 4.

The stalks delivered rearwardly between the apron 13 and the conveyer 27 pass into one end of what normally would be the threshing cylinder of the harvester thresher. In the construction illustrated, the threshing cylinder is removed, and a combined snapping and shelling unit transversely positioned with respect to the direction of travel of the apron 13 and conveyer 27 has been substituted. The snapping and shelling unit extends laterally from the conveyer 27. Said unit consists essentially of a rotating structure indicated in its entirety by the reference character 62, rolls 63 and 64 which functions as snapping rolls as well as husk and trash eliminating rolls, and surrounding stationary structure or cylinder which will be described in detail. The rotating structure 62 as best indicated in Figure 5 is journaled in bearing structures 65 and 66 carried by the said walls of the body of the harvester part of the machine. As indicated in Figure 5, said bearings may be carried by removable wall sections 67 and 68 whereby the rotating structure may be readily removed for the conversion from a harvester thresher to a corn harvesting and shelling machine.

The rotating structure 62 at the left end, as indicated in Figure 5, and over a substantial portion of its length is provided with a cylinder 69 to which a spiral 70 is secured. Said spiral is provided with a plurality of feeding fingers 70'. At the right end opposite the receiving end over a portion of its length, said rotating structure carries a shelling cylinder including a cylindrical portion 71 and a plurality of shelling elements 72. Spaced from the removable plate 68, a second plate 73 forms a cob-ejector compartment 74 in which a thrower or slinger element 75 is carried as a part of the rotating structure. An opening 76 in the upper portion of the plate 73 provides for the escape of cobs and other material not previously eliminated into the compartment 74. Said compartment, as best shown in Figure 6, is surrounded by a cylindrical wall 77, a large opening 78 being provided at the upper side for the delivery of material rearwardly into the thresher portion of the machine.

To cooperate with the rotating structure 62 above described, a curved perforate plate 79 extends around the lower portion of the rotating structure and rearwardly terminating in a sheet 80 extending adjacent to the lower snapping roll 63. At its forward portion the plate 79 has a flattened portion 81 cooperating with a shield 82 which extends rearwardly and downwardly from the rear end of the apron 13. As indicated in Figure 4, the stalks pass into the snapping and shelling device, and due to the rotation of the structure 62 in the direction indicated by the arrow in Figure 4 pass under the cylindrical portion 69 and therefrom into the snapping rolls 63 and 64, which rotate in the direction of the arrows indicated in Figure 4. Snapping of the ears then takes place in a conventional manner. The stalks and certain portions of the husks, together with some grain which is shelled and remains in the husks, pass to the cylinder beater 34. The material is thoroughly agitated by the beater and subsequently by the straw racks 33 which remove all the shelled grain therefrom.

The spirals 70 on the rotating structure 62 tend to move the stalks axially whereby they are delivered to different portions of the snapping rolls 63 and 64. The ears snapped therefrom slide downwardly onto the plate 79 and as they collect are engaged by the spiral 70 and move into the shelling portion of the device. A spiral deflector 82ª is arranged in cooperating relation with respect to the spiral 70 on a curved cover plate 83 extending above the rotating structure in concentric relation therewith. At the snapping end, said plate terminates at its forward edge adjacent a deflector member 84, which extends upwardly from the plate 83 to the shield 38 forming an entrance throat for the stalks being delivered from the apron 13 and the conveyer 27. At its forward edge the plate 83 terminates adjacent the upper snapping roll 64, which extends substantially the entire length of the rotating structure 62. As indicated by the reference character 85 in Figure 4, the plate 83 extends entirely around the rotating structure in the vicinity of the shelling cylinder 71, said shelling cylinder being entirely surrounded by the plate 83 with its extension 85, the perforate plate 79 with its extension 80 and the snapping rolls 63 and 64. Said surrounding structure forming generally a transverse cylinder surrounding the rotating structure and extending laterally beyond the delivery zone of the conveyers 13 and 27. Said rolls are extended along the shelling cylinder to form husk- and trash-eliminating means, as disclosed and claimed in the copending application 378,222 which became Patent Number 2,344,235 on March 14, 1944. Said rolls are also resiliently mounted as set forth in said application.

Figure 2 illustrates the resilient mounting of the snapping and trash-eliminating rolls. The upper roll 64 is carried on the plates 67 and 73 and mounted in a stationary position. The lower roll 63 is carried by a bracket 87 which is pivotally mounted on one end on an idler shaft 86 and resiliently mounted on the other end by means of a spring 88, a bolt 89, and a bracket 90, which forms a stop to limit upward movement of the bracket, the resilient means providing for downward movement of the bracket. The other ends of the husk removing rolls are similarly mounted as indicated in Figure 6, the upper roll 64 being mounted in a fixed bearing 91, and the lower roll being slidably mounted in a bearing 92 resiliently supported by a spring 93.

The operation of the device as above described has been explained in connection with the description of the elements thereof and their relationship. As previously stated, the drive mechanisms for the different portions of the machine have been indicated only diagrammatically and have not been described in detail. For example, as indicated in Figure 3, a V-belt 94 operated by a pulley 95 on the shaft 18 passes over pulleys 95 and 97 to a pulley 98 on the shaft 57 which drives the conveyer chain 56. Certain other of the drives were also described with connection with the description of the moving parts. Referring to Figure 3, a chain 99 driven by a sprocket 100 on the shaft 62 drives a sprocket 101 on the snapping roll 64. Said snapping roll, by means of conventional gearing, drives the other snapping roll. Any suitable drive mechanism may be provided. It is, therefore, applicant's intention to claim as his invention all variations in the structure and its use falling within the scope of the appended claims.

What is claimed is:

1. A corn snapper and sheller comprising stalk conveying means, a transverse chamber, said conveying means being positioned to deliver stalks across one end of said chamber, a rotating structure in said chamber, forwarding elements associated with said rotating structure for passing the stalks transversely through the chamber, a pair of snapping and husk eliminating rolls extending along the back side of the chamber the entire length thereof, the majority of the stalks being fed directly across the chamber and through said rolls whereby the ears are snapped therefrom, means on the rotating structure for feeding said ears axially of the chamber, cooperative shelling means formed in the chamber and on said rotating structure at the end of the chamber opposite the stalk-conveying means, said chamber having a discharge opening formed at the end thereof whereby husks and cobs are discharged therefrom, and a screen around the end of the cylinder occupied by said shelling means whereby shelled corn passes therethrough.

2. A corn snapper and sheller comprising stalk conveying means, a transverse cylinder, said conveying means positioned to deliver stalks across one end of said cylinder, said cylinder having a rotating structure therein, forwarding elements provided on the end of the rotating structure adjacent the stalk-conveying means for passing the stalks through the cylinder at that end transversely thereof, a pair of snapping and husk eliminating rolls extending along the back side of the cylinder the entire length thereof, the majority of the stalks being fed directly across the cylinder and through said rolls whereby the ears are snapped therefrom, cooperative shelling means formed on the cylinder and said rotating structure at the end of the cylinder opposite the stalk-conveying means, means on the rotating structure for feeding said ears axially of the cylinder toward the shelling means, said cylinder having a discharge opening formed at the end thereof whereby husks and cobs are discharged therefrom, and a screen around said end of the cylinder whereby the shelled corn passes therethrough.

3. A corn harvester and sheller comprising an upwardly inclined stalk-feeding conveyer, conveying chains cooperating with said conveyer to carry the stalks upwardly butt first, a transverse cylinder, said stalk-feeding conveyor constructed and arranged to deliver stalks to one end of said transverse cylinder, said cylinder having a rotating structure therein, forwarding elements on the one end of the rotating structure adjacent the stalk-feeding means for passing the stalks through the one end of the cylinder transversely thereof, a pair of snapping and husk eliminating rolls extending along the back side of the cylinder the entire length thereof, the stalks being fed directly across the cylinder and through said rolls whereby the ears are snapped therefrom, cooperative shelling means formed on the cylinder and said rotating structure at the end of the cylinder opposite the stalk-feeding means, means on the rotating structure for feeding said ears axially of the cylinder to said shelling means, said cylinder having a discharge opening formed in the end thereof whereby husks and cobs are discharged therefrom, and a screen at said end of the cylinder whereby shelled corn passes therethrough.

ALBERT B. WELTY.

(References on following page)

REFERENCES CITED

The following references are of record in the file of this patent:

UNITED STATES PATENTS

| Number | Name | Date |
|---|---|---|
| 640,961 | Sells | Jan. 9, 1900 |
| 653,865 | Gordon et al. | July 17, 1900 |
| 680,200 | Ferris | Aug. 16, 1901 |
| 1,017,783 | Merwin | Feb. 20, 1912 |
| 1,064,699 | Berns | June 17, 1913 |
| 1,607,001 | Kane | Nov. 16, 1926 |
| 1,770,792 | Lizamore | July 15, 1930 |
| 1,814,723 | MacGregor | July 14, 1931 |
| 1,901,092 | Fisk | Mar. 14, 1933 |
| 1,942,037 | Pierson | Jan. 2, 1934 |
| 2,344,235 | Crumb et al. | Mar. 14, 1944 |